United States Patent [19]
Fulford

[11] Patent Number: 5,913,332
[45] Date of Patent: Jun. 22, 1999

[54] ELECTRONIC VALVE INCLUDING AN EDGE FILTER

[75] Inventor: Mark G. Fulford, Peoria, Ill.

[73] Assignee: Caterpillar Inc., Peoria, Ill.

[21] Appl. No.: 08/767,901

[22] Filed: Dec. 17, 1996

[51] Int. Cl.$^6$ .................................................. F16K 47/08
[52] U.S. Cl. ...................... 137/544; 251/127; 251/129.15
[58] Field of Search ........................... 137/544; 251/118, 251/127, 129.15

[56] References Cited

U.S. PATENT DOCUMENTS

| | | | |
|---|---|---|---|
| 3,732,893 | 5/1973 | Ziesche et al. | 137/544 X |
| 4,624,415 | 11/1986 | Hofstetter, Jr. | 137/544 X |
| 5,515,829 | 5/1996 | Wear et al. | 123/446 |
| 5,516,424 | 5/1996 | Strohschein | 137/544 X |

*Primary Examiner*—John Rivell
*Attorney, Agent, or Firm*—Mario J. Donato

[57] ABSTRACT

The present invention is directed towards an electronic valve having a filter for filtering particulate matter from a fluid. The apparatus comprises a solenoid coil, an armature slidably disposed for limited axial sliding movement in response to current passing through the solenoid coil, a stator fixed relative to the solenoid coil, a bore extending toward the armature, a pin slidably disposed in the bore, a cage defining a cage aperture, and an edge filter disposed within the cage aperture.

8 Claims, 3 Drawing Sheets

ELECTRONIC VALVE INCLUDING AN EDGE FILTER

TECHNICAL FIELD

The present invention relates generally to a valve for controlling fluid pressure, and more particularly, to an electronic valve having an edge filter for filtering particulate matter from the fluid.

BACKGROUND ART

Examples of hydraulically-actuated fuel injection systems are shown in U.S. Pat. No. 5,191,867 issued to Glassey, et al. on Mar. 9, 1993, and U.S. Pat. No. 5,213,083 issued to Glassey on May 25, 1993, both being assigned to the assignee of the present invention. Engines equipped with a hydraulically-actuated fuel injection system (HEUI fuel system) employ an actuating pump to provide actuating fluid at elevated pressures to injectors, intensifying the pressure of the fuel being injected into the engine. Control of the fuel injection pressure is achieved by controlling the pressure of the actuating fluid. Typically, control of the actuating fluid pressure is achieved by employing a fixed displacement pump to elevate the fluid pressure and regulating that pressure to lower levels by bleeding off unneeded flow volume through a rail pressure control valve, past which the unneeded fluid returns to an actuating fluid sump such as an engine oil pan. The rail pressure control valve contains a filter therein, preferably a cartridge edge filter, for filtering particulate matter from the fluid. Cartridge edge filters fit tightly in the housing into which they are placed. However, it was found that failures of the rail pressure control valve were occurring because of the filter used therein.

The present invention is directed to overcoming the problem as set forth above.

DISCLOSURE OF THE INVENTION

The present invention is directed towards an electronic valve having a filter for filtering particulate matter from a fluid. The apparatus comprises a solenoid coil, an armature slidably disposed for limited axial sliding movement in response to current passing through the solenoid coil, a stator fixed relative to the solenoid coil, a bore extending toward the armature, a pin slidably disposed in the bore, a cage defining a cage aperture, and an edge filter disposed within the cage aperture.

BRIEF DESCRIPTION OF THE DRAWINGS

For a better understanding of the present invention, reference may be made to the accompanying drawings, in which.

DESCRIPTION OF A PREFERRED EMBODIMENT OF THE INVENTION

Figure 1:
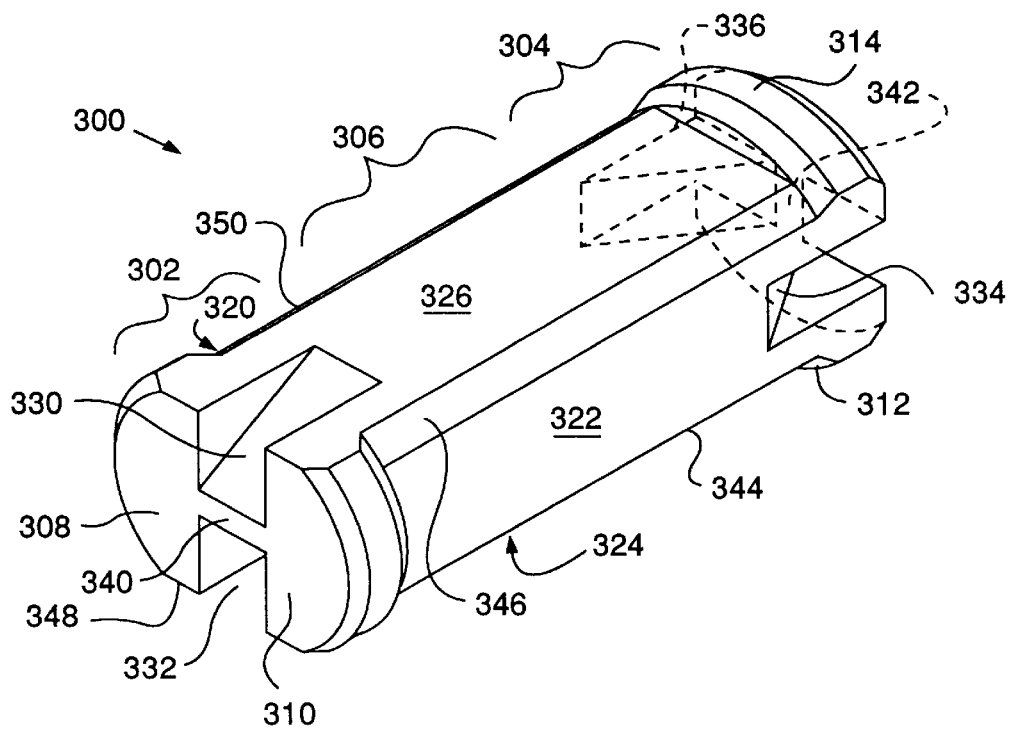
FIG. 1 is a perspective view of a preferred embodiment of the cartridge edge filter.
Figure 2:
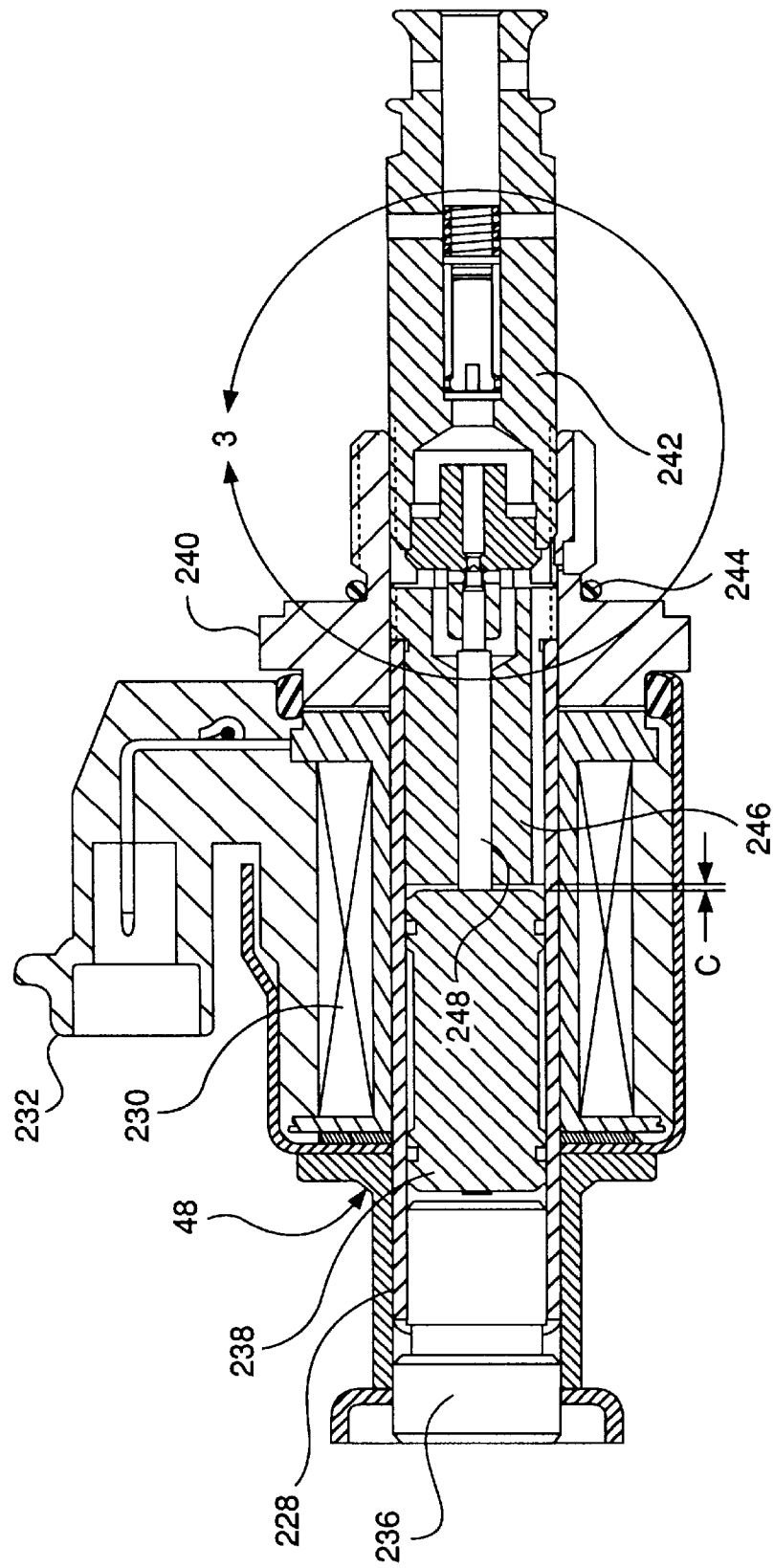
FIG. 2 is a diagrammatic cross-sectional view of an electronic valve including a cartridge edge filter.

A pump control valve subassembly 48, best seen in FIGS. 1 and 2, is in part disposed in a control valve bore 226 in a valve body extension (not shown). A portion of the pump control valve 48 not disposed in the control valve bore 226 extends externally from the valve body. The pump control valve 48 has a cylindrical sleeve portion 228. A solenoid coil 230 surrounds part of the sleeve 228. An electrical connector 232 extends from the solenoid coil 230 so that an electrical conductor can transmit a signal from an electronic control module (not shown) to the solenoid coil 230. In a first end of the cylindrical sleeve portion of 228 of the control valve 48, a control valve plug 236 is disposed to seal that end of the cylindrical sleeve portion 228. Slidably disposed within the cylindrical sleeve portion 228 and generally aligned with the solenoid coil 230 is a solenoid armature 238.

A collar portion 240 is disposed over a second end of the cylindrical portion 228, and links the sleeve portion 228 with axially aligned cage portion 242. The collar portion 240 has internal threads threadingly engaging the cage portion 242. The collar portion 240 also has external threads retaining it in the valve body extension and a seal 244 resisting the flow of any actuating fluid between the collar portion 240 and the valve body.

A solenoid stator 246 is largely disposed in the cylindrical sleeve portion 228. The stator 246 is restrained from axial movement. The length of the stator is such that there is an axial gap C between the armature 238 and the stator 246 when the armature is disposed against the control valve plug 236. An actuating pin 248 is slidably disposed in a pin bore 250 passing axially therethrough. The actuating pin 248 pushes against a poppet pin 249 having a relatively larger diameter guide portion 252 and a poppet head portion 254. The combined axial length of the pins 248, 249 is greater than the length of the stator plus the length of gap C.

The stator 246 has a lubrication aperture 256 which is larger in diameter than the pin bore 250 and which is disposed opposite the armature 238. A stator boss 258 extends from the stator around the lubrication aperture 256.

A seat 260 for the poppet head 254 is largely disposed in a seat bore in the cage 242 and abutting the stator boss 258. The poppet head seat 260 has a shank portion 264 axially extending into the lubrication aperture 256.

The seat 260 has an axially extending aperture 266 passing therethrough. The aperture through the seat varies in diameter along its axis. A first diameter of the aperture 266 is sufficiently large to accommodate sliding motion of the pin transition portion 252 therein. The aperture 266 has a second diameter portion smaller than the poppet head 254. This second small diameter portion expands to a third larger diameter portion open to a void in the cage 242.

The poppet head 254 operably and sealingly seats against the poppet head seat 260 to block flow from the cage 242 past the poppet head 254. The poppet head seat 260 has an exhaust passage 268 intersecting the aperture 266 of the poppet head seat to connect it with the lubrication aperture 256 at a point approximately aligned with the pin transition portion 252. The exhaust passage 268 is also in fluid communication with an exhaust channel 270 in the collar portion 240 for passage of fluid to an exhaust chamber 272 of the valve body for passage to the sump (not shown).

The cage 242 has an axial aperture 274 which is part of an inlet passage of the valve 48 extending therethrough, a first end of the cage axial aperture 274 being for fluid communication with the aperture 266 through the poppet head seat 260. An edge filter 300 is disposed in the cage axial aperture 274. The edge filter 300 of the pump control valve 48 prevents the passage of relatively large pieces of debris from blocking or in any way interfering with the relatively small aperture 266 in the poppet head seat 260. A seal 286 is disposed in a groove 290 proximate to an end of the cage 242 to provide a radial sealing relationship between the cage 242 and the control valve bore 226.

Figure 3:
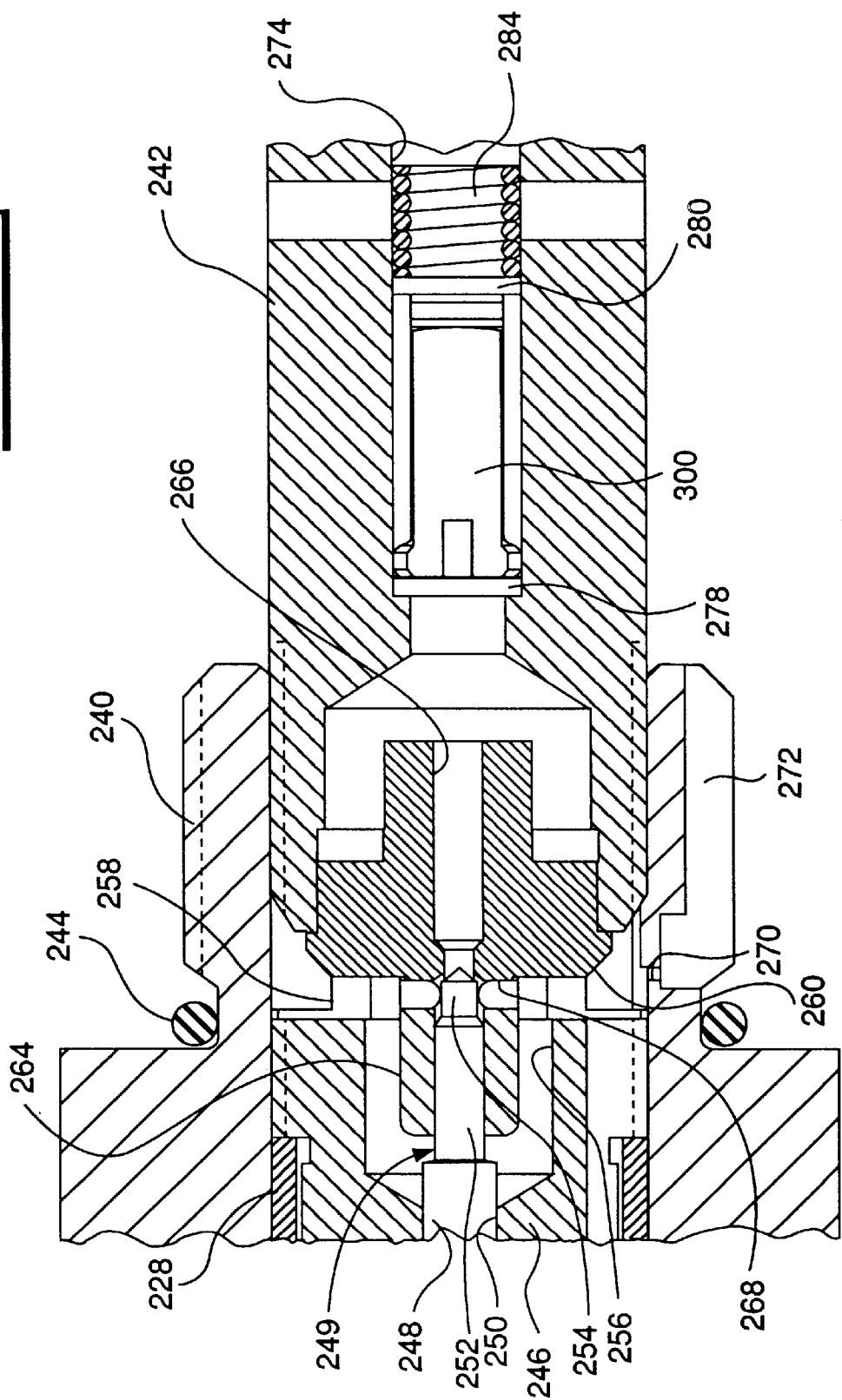
FIG. 3 is an enlarged diagrammatic cross-sectional view of circle 3 of FIG. 2.

Referring now to FIG. 3, a view in perspective of a preferred embodiment of edge filter 300 is shown. As described above, edge filter 300 is adapted to be placed in cage axial aperture 274. As seen in FIG. 3, edge filter 300 includes a body member having a first end portion 302, a second end portion 304, and a middle portion 306 disposed between the first and second end portions 302 and 304. The body member has a first side 320, a second side 322, a third side 324, and a fourth side 326. The body member includes a first edge 344, a second edge 346, a third edge 348, and a fourth edge 350. A first flange 308 is connected to the first end portion 302 and is disposed on the first side 320. A second flange 310 is connected to the first end portion 302 and is disposed on the second side 322. Flanges 308 and 310 define a first axis of flange orientation, and in a preferred embodiment extend in substantially opposite directions relative to each other. A third flange 312 is connected to the second end portion 304 and is disposed on the third side 324. A fourth flange 314 is connected to the second end portion 304 and is disposed on the fourth side 326. Flanges 312 and 314 define a second axis of flange orientation, and in a preferred embodiment extend in substantially opposite directions relative to each other. In the preferred embodiment, the first and second axes of orientation are substantially perpendicular to the longitudinal axis L.

As seen in FIG. 3, first and second flanges 308 and 310 are offset from third and fourth flanges 312 and 314. In the preferred embodiment, first flange 308 is offset approximately ninety degrees from fourth flange 314, and second flange 310 is offset approximately ninety degrees from third flange 312. Although a preferred embodiment is described as including flanges 308 and 314, and flanges 310 and 312, as being offset by approximately ninety degrees from each other, and further described as including flanges 308 and 310, and 312 and 314, extending in substantially opposite directions relative to each other, it will be appreciated by those skilled in the art that other suitable flange orientations can be readily and easily used without deviating from the spirit and scope of the present invention.

As seen in FIG. 3, a first fluid passing groove 330 is disposed on the fourth side 326 and extends from the first end portion 302 toward the second end portion 304. A second fluid passing groove 332 is disposed on the third side 324 and extends from the first end portion 302 toward the second end portion 304. First and second fluid passing grooves 330 and 332 define a first web portion 340. A third fluid passing groove 334 is disposed on the second side 322 and extends from the second end portion 304 toward the first end portion 302. A fourth fluid passing groove 336 is disposed on the first side 320 and extends from the second end portion 304 toward the first end portion 302. Third and fourth fluid passing grooves 334 and 336 define a second web portion 342. First and second web portions 340 and 342 are structural enhancements which provide support at the respective end portions 302 and 304 of the cartridge edge filter 300 and assist in maintaining the close diametrical tolerances.

As described above, cartridge edge filters fit tightly into the housing into which they are placed. Close tolerances and burr-free surfaces are required in order to produce operationally effective cartridge edge filters. It is the close tolerances, de-burring, inspection, and resizing operations that significantly increase manufacturing costs of the filter. To address these problems, the cartridge edge filter 300 of the present invention has flats or sides 320, 322, 324, and 326 broached on a substantially cylindrical solid, with rounded segments or flanges 308, 310, 312, and 314 remaining at the perimeter of each end portion 302 and 304. Flanges 308, 310, 312, and 314 form the seal between the cartridge edge filter 300 and the housing into which the filter 300 is placed. In opposite ends of the filter 300, two pairs of fluid passing grooves 330 and 332, and 334 and 336 are provided. Fluid passing grooves 330, 332, 334, and 336 may be provided by broaching, slitting saw, grinding wheel, or other suitable manufacturing process. Each pair of fluid passing grooves 330/332, and 334/336, defines a web portion 340, 342 respectively. The web portions 340 and 342 provide structural support at the respective end portions of the filter, and assist in maintaining the diametrical tolerance necessary.

In the preferred embodiment, grooves 330 and 332 are placed at an angle relative to each other, and grooves 334 and 336 are placed at an angle relative to each other. Although a preferred embodiment is described as including grooves 330 and 332, and grooves 334 and 336, as being placed at an angle relative to each other, it will be appreciated by those skilled in the art that other suitable groove orientations can be readily and easily used without deviating from the spirit and scope of the present invention. For example, grooves 330 and 332 may be placed parallel to each other, and grooves 334 and 336 may be placed parallel to each other, without deviating from the spirit and scope of the present invention.

In addition, although grooves 330, 332, 334, and 336 are shown extending from their respective end portions 302, 304 to the middle portion 306, it will be appreciated by those skilled in the art that other suitable groove orientations can be readily and easily used without deviating from the spirit and scope of the present invention. For example, any one of the grooves may extend completely between first end portion 302 and second end portion 304, or may extend anywhere between first and second end portions 302 and 304 without deviating from the spirit and scope of the present invention Referring to FIGS. 1–3 and in operation, fluid is permitted to flow in the first end of cage axial aperture 274 and through the first and second grooves 330 and 332. The fluid then flows across a surface of the body adjacent each of the first and second grooves 330 and 332. Fluid is restricted from flowing past third and fourth flanges 312 and 314, and therefore flows around third and fourth flanges 312 and 314, through third and fourth grooves 334 and 336, and out the second end of the cage axial aperture 274, such that particulate matter having a size greater than the difference between the inside radius of the aperture 274 and the radial distance of a corresponding edge of the filter 300 is trapped at the respective filter edge.

Figure 4:
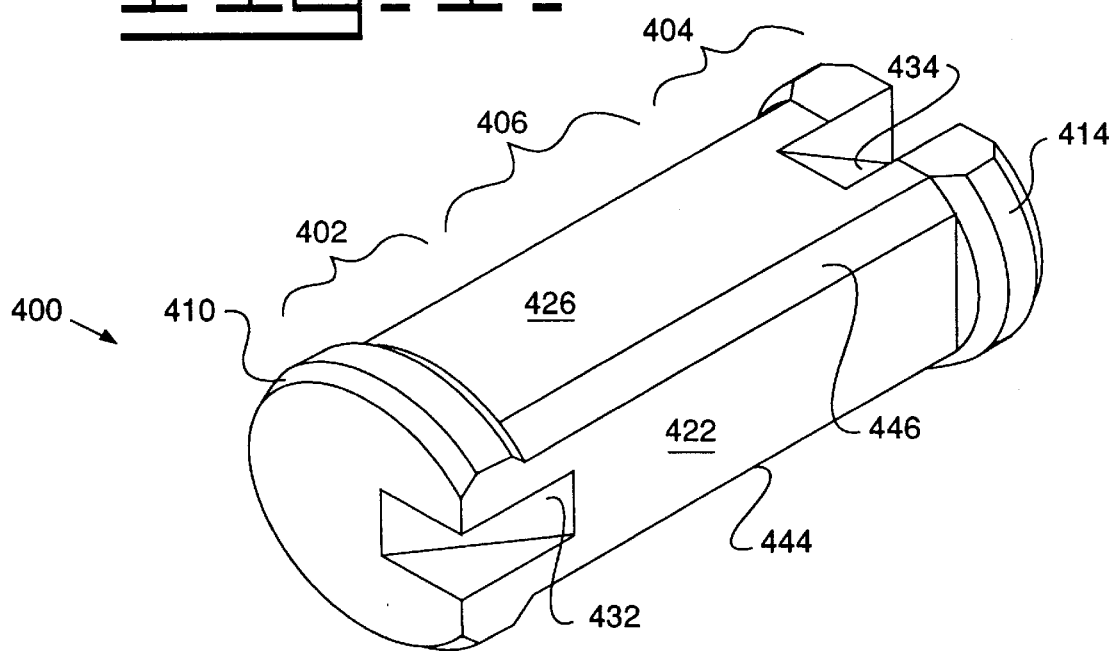
FIG. 4 is a perspective view of an alternate embodiment of the cartridge edge filter.

Referring to FIG. 4, an alternate embodiment of the cartridge edge filter is shown comprising a body member having a single fluid passing groove 432 and 434 disposed at each respective end portion 402 and 404. As described above, although grooves 432 and 434 are shown extending from their respective end portions 402, 404 to the middle portion 406, it will be appreciated by those skilled in the art that other suitable groove orientations can be readily and easily used without deviating from the spirit and scope of the present invention. A flange 410 is connected to the first end portion 402. Another flange 414 is connected to the second end portion 404. Flanges 410 and 414 form the seal between the cartridge edge filter 400 and the housing into which the filter 400 is placed. The body member has at least two sides 422 and 426, respectively, which define edges 444 and 446.

With reference to FIGS. 1, 2 and 4, fluid is permitted to flow in the first end of cage axial aperture 274 and through groove 434. The fluid then flows across a surface of the body adjacent groove 434. Fluid is restricted from flowing past flange 410, and therefore flows around flange 410, through groove 432, and out the second end of the cage axial aperture 274, such that particulate matter having a size greater than the difference between the inside radius of the aperture 274 and the radial distance of a corresponding edge of the filter 400 is trapped at the respective filter edge.

Thus, while the present invention has been particularly shown and described with reference to the preferred embodiment above, it will be understood by those skilled in the art that various additional embodiments may be contemplated without departing from the spirit and scope of the present invention.

I claim:

1. An electronic valve, comprising:

a solenoid coil;

an armature slidably disposed for limited axial sliding movement in response to current passing through the solenoid coil;

a stator fixed relative to the solenoid coil defining an inlet passage, an exhaust passage, a valve seat disposed between the inlet passage and the exhaust passage and a bore extending toward the armature;

a pin slidably disposed in the bore having a first end configured to sealingly seat in the valve seat when firmly pressed there by the armature and having a second end extending beyond the stator toward the armature when the pin is seated, wherein to increase current to the solenoid coil increases a force of the armature against the pin, thereby increasing resistance to fluid flow through the valve from the inlet passage through the exhaust passage;

a cage operably connected to the valve seat defining a cage aperture; and an edge filter disposed within said cage aperture, said edge filter comprising a body member having a first end portion, a second end portion, and a middle portion disposed between said first and second end portions;

a first flange and a second flange connected to said first end portion;

a third flange and a fourth flange connected to said second end portion, a first fluid passing groove and a second fluid passing groove extending from said first end portion toward said second end portion, said first and second fluid passing grooves defining a first web portion; and a third fluid passing groove and a fourth fluid passing groove extending from said second end portion toward said first end portion, said third and fourth fluid passing grooves defining a second web portion.

2. An electronic valve as recited in claim 1, wherein said first flange and said second flange extend in opposite directions relative to each other.

3. An electronic valve as recited in claim 1, wherein said third flange and said fourth flange extend in opposite directions relative to each other.

4. An electronic valve as recited in claim 1, wherein said filter includes a longitudinal axis, said first and second flanges defining a first axis of flange orientation, said third and fourth flanges defining a second axis of flange orientation, said first and second axes of flange orientation being substantially perpendicular to said longitudinal axis, said first and second flanges being offset from said third and fourth flanges.

5. An electronic valve, comprising:

a solenoid coil;

an armature slidably disposed for limited axial sliding movement in response to current passing through the solenoid coil;

a stator fixed relative to the solenoid coil defining an inlet passage, an exhaust passage, a valve seat disposed between the inlet passage and the exhaust passage and a bore extending toward the armature;

a pin slidably disposed in the bore having a first end configured to sealingly seat in the valve seat when firmly pressed there by the armature and having a second end extending beyond the stator toward the armature when the pin is seated, wherein to increase current to the solenoid coil increases a force of the armature against the pin, thereby increasing resistance to fluid flow through the valve from the inlet passage through the exhaust passage;

a cage operably connected to the valve seat defining a cage aperture; and an edge filter disposed within said cage aperture, said edge filter comprising a body member comprising a first end portion, a second end portion, and a middle portion disposed between said first and second end portions, said body member having a first side, a second side, a third side, and a fourth side, said body member including a first edge, a second edge, a third edge, and a fourth edge;

a first flange connected to said first end portion and disposed on said first side;

a second flange connected to said first end portion and disposed on said second side;

a third flange connected to said second end portion and disposed on said third side;

a fourth flange connected to said second end portion and disposed on said fourth side;

a first fluid passing groove disposed on said fourth side and extending from said first end portion toward said second end portion;

a second fluid passing groove disposed on said third side and extending from said first end portion toward said second end portion, said first and second fluid passing grooves defining a first web portion;

a third fluid passing groove disposed on said second side and extending from said second end portion toward said first end portion; and a fourth fluid passing groove disposed on said first side and extending from said second end portion toward said first end portion, said third and fourth fluid passing grooves defining a second web portion.

6. An electronic valve as recited in claim 5, wherein said first flange and said second flange extend in opposite directions relative to each other.

7. An electronic valve as recited in claim 5, wherein said third flange and said fourth flange extend in opposite directions relative to each other.

8. An electronic valve as recited in claim 5, wherein said filter includes a longitudinal axis, said first and second flanges defining a first axis of flange orientation, said third and fourth flanges defining a second axis of flange orientation, said first and second axes of flange orientation being substantially perpendicular to said longitudinal axis, said first and second flanges being offset from said third and fourth flanges.

* * * * *